Figure 1:
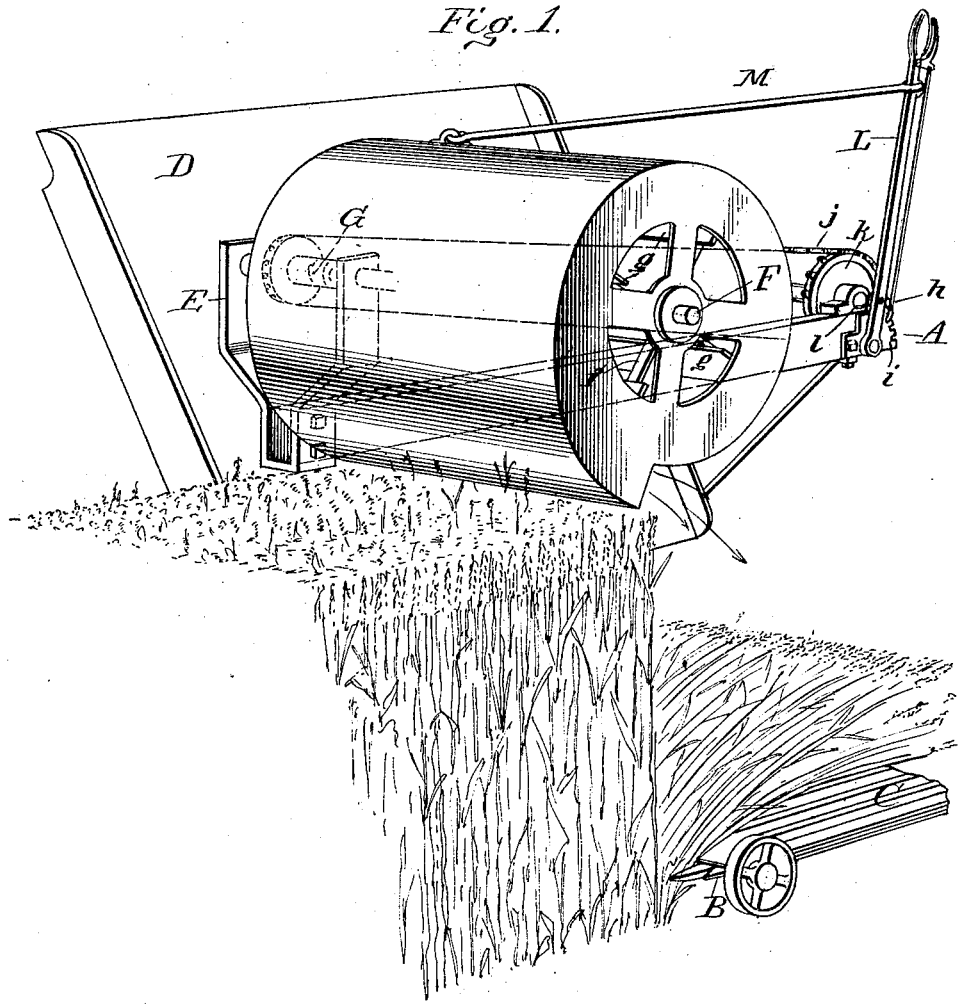

No. 770,263. PATENTED SEPT. 20, 1904.
J. C. CLAUNCH.
HARVESTER.
APPLICATION FILED FEB. 5, 1904.
NO MODEL. 2 SHEETS—SHEET 1.

Witnesses
Inventor
J. C. Claunch
by James Shurly Attorney

No. 770,263. PATENTED SEPT. 20, 1904.
J. C. CLAUNCH.
HARVESTER.
APPLICATION FILED FEB. 5, 1904.
NO MODEL. 2 SHEETS—SHEET 2.
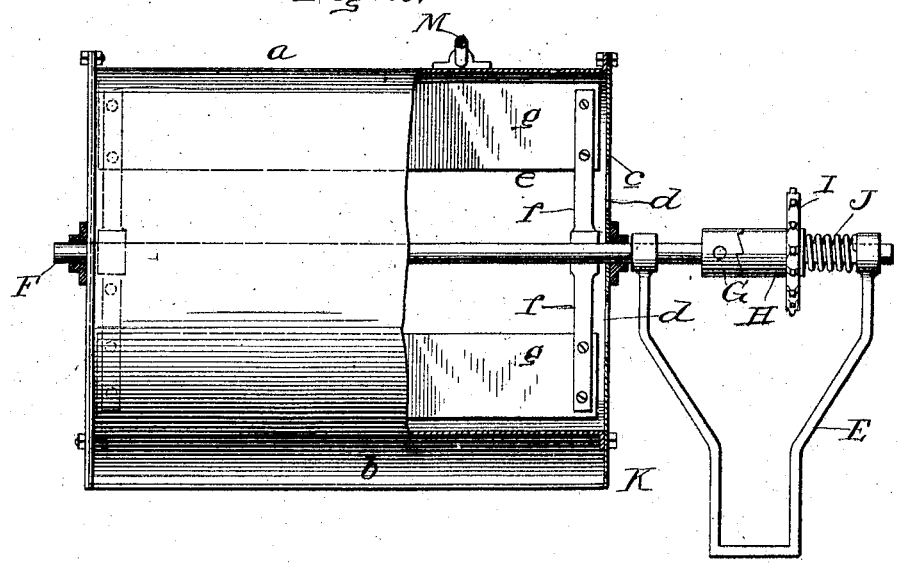
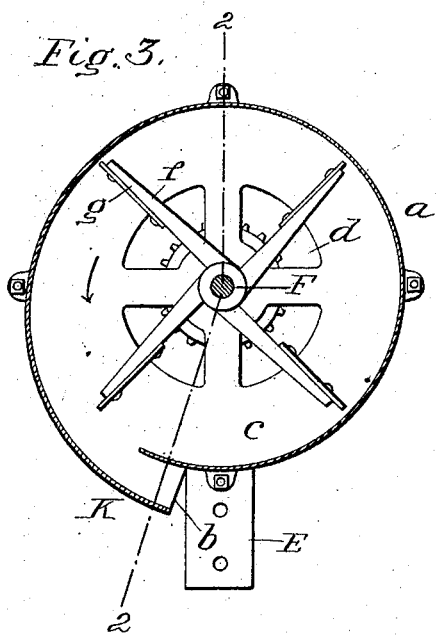

No. 770,263. Patented September 20, 1904.

UNITED STATES PATENT OFFICE.

JEREMIAH CYRUS CLAUNCH, OF WAXAHACHIE, TEXAS.

HARVESTER.

SPECIFICATION forming part of Letters Patent No. 770,263, dated September 20, 1904.

Application filed February 5, 1904. Serial No. 192,124. (No model.)

*To all whom it may concern:*

Be it known that I, JEREMIAH CYRUS CLAUNCH, a citizen of the United States, residing at Waxahachie, in the county of Ellis and State of Texas, have invented new and useful Improvements in Harvesters, of which the following is a specification.

My invention pertains to harvesters; and it has for its object to provide improved means for forcing the cut grain on the conveyer, usually provided in rear of the cutting apparatus.

The invention will be fully understood from the following description and claims when taken in connection with the accompanying drawings, in which—

Figure 1 is a perspective view illustrating a portion of a harvester equipped with my improved device for forcing cut grain on the conveyer in operation. Fig. 2 is a view, partly in rear elevation and partly in vertical section, of the improved device, the sectional part being taken on the line 2 2 of Fig. 3; and Fig. 3 is a transverse section taken through the blower comprised in my improvements.

Similar letters designate corresponding parts in all of the views of the drawings, referring to which—

A is a portion of the main frame of a harvester; B, the cutting apparatus thereof; C, the conveyer in rear of the cutting apparatus, and D an elevator-frame. These parts may be and preferably are of the construction common to harvesters extant.

E is a yoke bolted or otherwise fixed to the forward portion of the main frame A and forming part of my improvements; F, a transversely-disposed shaft journaled adjacent to one of its ends in the arms of the yoke and resting in a plane above and in advance of the cutting apparatus B; G, a clutch member fixed on the shaft F between the arms of the yoke E; H, a complementary clutch member loosely mounted on the shaft between the arms of the yoke and bearing a sprocket-gear I; J, a coiled spring surrounding the shaft and interposed between the clutch member H and the arm of the yoke remote from the clutch member G, and K a blower which is carried by the portion of the shaft above and in advance of the cutting apparatus B. In the present and preferred embodiment of my invention the said blower K comprises a casing *a*, having a rearwardly-disposed discharge *b*, extending throughout the length of its lower portion, and also having detachable heads *c*, loosely mounted on the shaft F and provided with openings *d* for the admission of air, and a fan *e*, disposed in the casing *a* and made up of arms *f*, fixed on the shaft F, and blades *g*, carried by said arms.

L is a hand-lever fulcrumed on the main frame A and provided with a detent *h*, arranged to engage a segmental rack *i*, fixed on the said frame A, and M is a link connecting the casing *a* of the blower, preferably the upper portion thereof and the lever L.

In the practical operation of my improvements the blower K is adjustably fixed in position through the medium of the lever L and its appurtenances and the harvester is driven through a field of grain after the usual manner. When the harvester is moved, as stated, the fan *e* of the blower will be rotated at a high rate of speed through the medium of a belt *j*, which takes around the sprocket-gear I and also around a sprocket-gear *k* on a suitable driven shaft *l* of the harvester, Fig. 1, and in consequence the fan of the blower will rotate at a high rate of speed in the direction indicated by arrow in Fig. 3. In virtue of this it will be observed that a continuous and strong blast of air will be forced through the rearwardly-disposed discharge *b* of the blower and one which may be depended on to force the cut grain on the conveyer C after the manner shown in Fig. 1. It will also be observed that while the blast of air is highly efficient in forcing the grain on the conveyer C the grain is not subjected to shock, as is the case when the ordinary reel is used, and consequently the liability of any considerable portion of kernels being knocked out of the heads is reduced to a minimum.

While the fan of the blower K is driven at a high rate of speed from a suitable shaft of the harvester, it will be observed that in the event of the harvester being suddenly stopped the fan will continue to rotate, this because of the gear I being clutched on the shaft F in the manner before described. From this it follows that when the harvester is suddenly stopped the momentum obtained by the fan is effectually prevented from causing breakage of any of the parts.

In virtue of the blower-casing being loosely mounted on the shaft F and adjustably fixed in position through the medium of the lever L and the appurtenances thereof it will be observed that the operator of the harvester is enabled at will to quickly and easily turn the blower-casing on its axis, so as to direct the blast of air to the best advantage.

Notwithstanding the practical advantages of my improvements as pointed out in the foregoing, it will be noticed that they are simple and inexpensive, and therefore add but little to the cost of a harvester; also, that they are light and require but little power for their operation, and do not, therefore, materially increase the draft of the harvester.

I have entered into a detailed description of the construction and relative arrangement of the parts embraced in the present and preferred embodiment of my invention in order to impart a full, clear, and exact understanding of the same. I do not desire, however, to be understood as confining myself to such specific construction and relative arrangement of parts, as such changes or modifications may be made in practice as fairly fall within the scope of my invention as claimed.

Having described my invention, what I claim, and desire to secure by Letters Patent, is—

1. The combination with the main frame and the conveyer of a harvester; of a transversely-disposed shaft journaled in suitable bearings on the main frame, a blower carried by said shaft and comprising a casing loosely mounted on the shaft and having a discharge, and a fan disposed in the casing and fixed to the shaft, and means for adjustably fixing the blower-casing against rotary movement on the shaft.

2. The combination with the main frame and the conveyer of a harvester; of a transversely-disposed shaft journaled in suitable bearings on the main frame, and resting above and in advance of the conveyer, a blower carried by said shaft, and comprising a casing having a rearwardly-disposed discharge, and also having heads loosely mounted on the shaft and provided with openings for the admission of air, and a fan disposed in the casing, and fixed to the shaft, and means for adjustably fixing the blower-casing against rotary movement on the shaft.

3. The combination with the main frame and the conveyer of a harvester; of a transversely-disposed shaft journaled in suitable bearings on the main frame, and resting above and in advance of the conveyer, a blower carried by said shaft, and comprising a casing loosely mounted on the shaft and having a rearwardly-disposed discharge, and a fan disposed in the casing, and fixed to the shaft, a lever fulcrumed on the harvester-frame, a connection between said lever and the blower-casing, and means for adjustably fixing the lever.

4. The combination with the main frame and the conveyer of a harvester; of a yoke fixed to the forward portion of the frame, and having arms, a transversely-disposed shaft journaled adjacent to one of its ends in the arms of the yoke, and resting above and in advance of the conveyer, a clutch member fixed on the shaft, between the arms of the yoke, a complementary clutch member loosely mounted on the shaft, between said arms, and bearing a sprocket-gear, a blower carried by the shaft, and comprising a casing having a rearwardly-disposed discharge, and also having heads loosely mounted on the shaft and provided with openings for the admission of air, and a fan disposed in the casing, and fixed on the shaft, means for adjustably fixing the blower-casing against rotary movement on the shaft, a shaft journaled in the main frame of the harvester, and bearing a sprocket-gear, and a sprocket-belt connecting said gear and the gear on the clutch member.

In testimony whereof I have hereunto set my hand in presence of two subscribing witnesses.

JEREMIAH CYRUS CLAUNCH.

Witnesses:
R. J. COLEMAN,
D. C. YANGER.